US011234169B2

(12) United States Patent
Chen et al.

(10) Patent No.: US 11,234,169 B2
(45) Date of Patent: Jan. 25, 2022

(54) METHODS AND APPARATUSES FOR SIGNALING HOPPING TRANSMISSION

(71) Applicant: QUALCOMM Incorporated, San Diego, CA (US)

(72) Inventors: Wanshi Chen, San Diego, CA (US); Sudhir Kumar Baghel, Hillsborough, NJ (US); Peter Gaal, San Diego, CA (US); Shailesh Patil, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/562,044

(22) Filed: Sep. 5, 2019

(65) Prior Publication Data

US 2020/0084672 A1    Mar. 12, 2020

Related U.S. Application Data

(60) Provisional application No. 62/728,047, filed on Sep. 6, 2018.

(51) Int. Cl.
*H04W 28/26*    (2009.01)
*H04W 4/40*    (2018.01)
*H04B 1/7143*    (2011.01)
*H04L 27/26*    (2006.01)

(52) U.S. Cl.
CPC .......... *H04W 28/26* (2013.01); *H04B 1/7143* (2013.01); *H04L 27/2607* (2013.01); *H04W 4/40* (2018.02)

(58) Field of Classification Search
CPC ...... H04W 28/26; H04W 4/40; H04B 1/7143; H04L 27/2607
USPC ........................................................ 370/329
See application file for complete search history.

(56) References Cited

U.S. PATENT DOCUMENTS

| 2008/0025285 | A1 | 1/2008 | Kwon et al. |
| 2015/0271807 | A1 | 9/2015 | Shailesh et al. |
| 2017/0289733 | A1* | 10/2017 | Rajagopal ............... H04W 4/70 |
| 2017/0294939 | A1 | 10/2017 | Wang |
| 2018/0006779 | A1 | 1/2018 | Yi |
| 2018/0110057 | A1* | 4/2018 | Park ..................... H04B 7/0404 |
| 2020/0136777 | A1* | 4/2020 | He ..................... H04W 72/1284 |

OTHER PUBLICATIONS

International Search Report and Written Opinion—PCT/US2019/049887—ISA/EPO—Nov. 7, 2019.

(Continued)

*Primary Examiner* — Yemane Mesfin
*Assistant Examiner* — Intekhaab A Siddiquee
(74) *Attorney, Agent, or Firm* — Patterson & Sheridan, LLP

(57) ABSTRACT

Certain aspects of the present disclosure provide techniques for signaling frequency hopping information for data transmissions sent over a plurality of transmission time intervals. In some cases, a sequence may be selected and transmitted to indicate whether frequency hopping is used and/or additional information about how the frequency hopping will occur.

26 Claims, 11 Drawing Sheets

(56) References Cited

OTHER PUBLICATIONS

NTT DOCOMO, et al., "Views on sPUCCH Design", 3GPP TSG RAN WG1 Meeting #88bis, 3GPP Draft; RI-1705689, 3rd Generation Partnership Project (3GPP), Mobile Competence Centre; 650, Route Des Lucioles; F-06921 Sophia-Antipolis Cedex; France, vol. RAN WG1, No. Spokane, USA, 20170403-20170407, Apr. 2, 2017 (Apr. 2, 2017), pp. 1-9, XP051243805, Retrieved from the internet: URL: http://www.3gpp.org/ftp/Meetings_3GPP_SYNC/RAN1/Docs/ [retrieved on Apr. 2, 2017] the whole document.

Xia S., et al., "Uplink Control Channel Design for 5 Ultra-Low Latency Communication", 2016 IEEE 27th Annual International Symposium on Personal, Indoor, and Mobile Radio Communications (PIMRC), IEEE, Sep. 4, 2016 K2016-09-04), pp. 1-6, XP033035319, DOI: 10.1109/PIMRC.2016.7794687 [retrieved on Dec. 21, 2016] abstract, Sections I and II.

* cited by examiner

METHODS AND APPARATUSES FOR SIGNALING HOPPING TRANSMISSION

CLAIM OF PRIORITY

The present application for patent claims benefit of U.S. Provisional Patent Application Ser. No. 62/728,047, filed Sep. 6, 2018, which is assigned to the assignee hereof and hereby expressly incorporated by reference herein.

FIELD OF THE DISCLOSURE

Aspects of the present disclosure relate to wireless communications, and more particularly, to techniques for signaling frequency hopping information for transmissions across one or more transmission time intervals (TTIs).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications in a network by a user equipment (UE). The method generally includes selecting a sequence and first resources for use in transmitting the sequence, transmitting the sequence using the first resources to reserve second resources for data transmissions to another wireless device over one or more transmission time intervals (TTIs), wherein at least one of the sequence or the first resources are selected to indicate information regarding frequency hopping, and transmitting the data with frequency hopping applied over one or more TTIs in accordance with the information.

Certain aspects provide a method for wireless communications in a network by a user equipment (UE). The method generally includes detecting a sequence transmitted, by another device using first resources, determining, based on at least one of the sequence or the first resources, information regarding frequency hopping used for data transmissions from the other device on second resources over one or more transmission time intervals (TTIs), and processing the data, transmitted over the TTIs using the second resources, in accordance with the frequency hopping information.

Aspects of the present disclosure also provide apparatus, methods, processing systems, and computer readable mediums for performing the operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
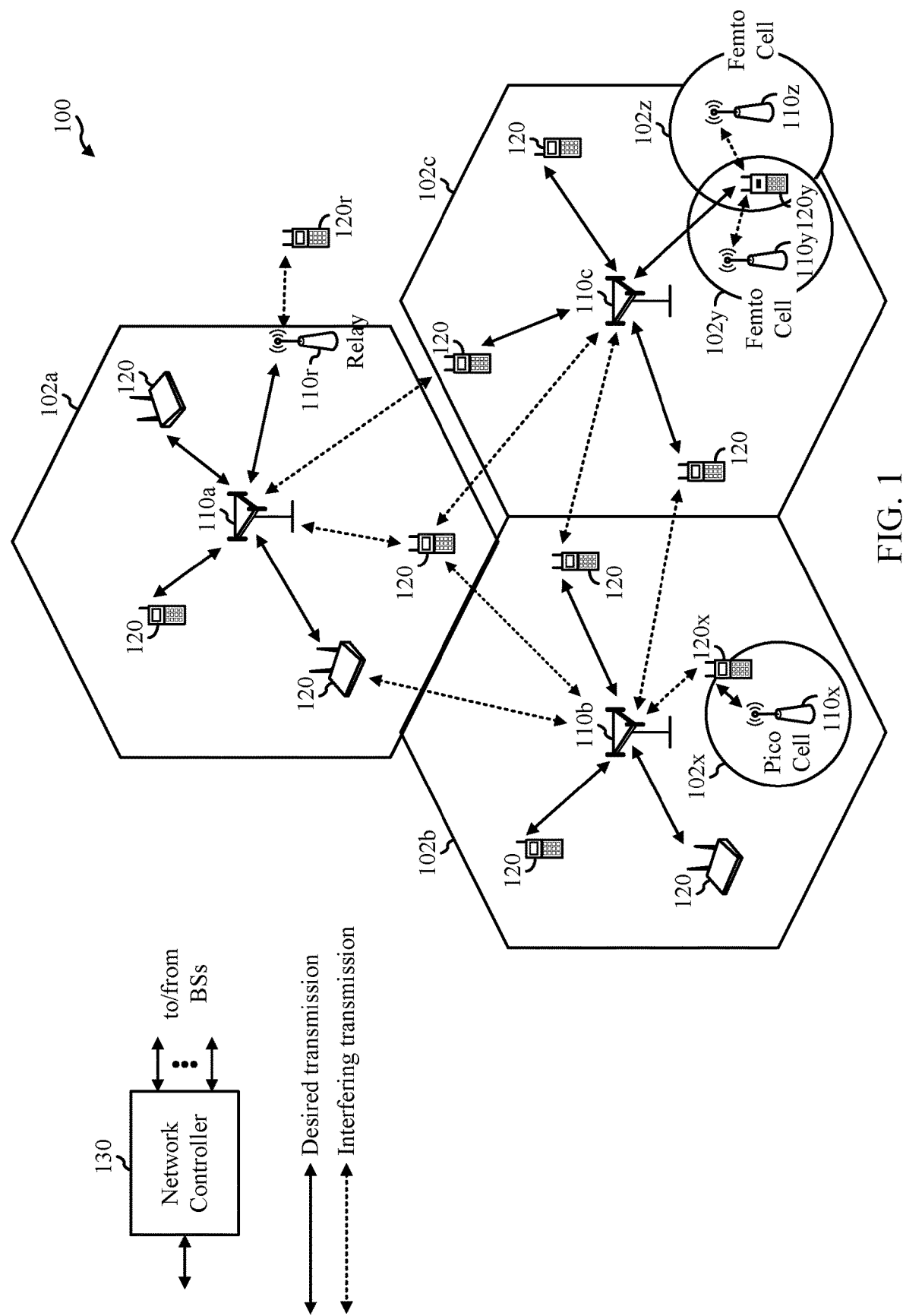
FIG. 1 is a block diagram conceptually illustrating an example telecommunications system, in accordance with certain aspects of the present disclosure.

Aspects of the present disclosure provide apparatus, methods, processing systems, and computer readable mediums for signaling frequency hopping information for transmissions over one or more transmission time intervals (TTIs).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (SGTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. In some cases, UEs 120 may be configured to communicate via autonomous resource allocation. In such cases, UEs 120 may be configured to perform operations described below with reference to FIGS. 8 and 9.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
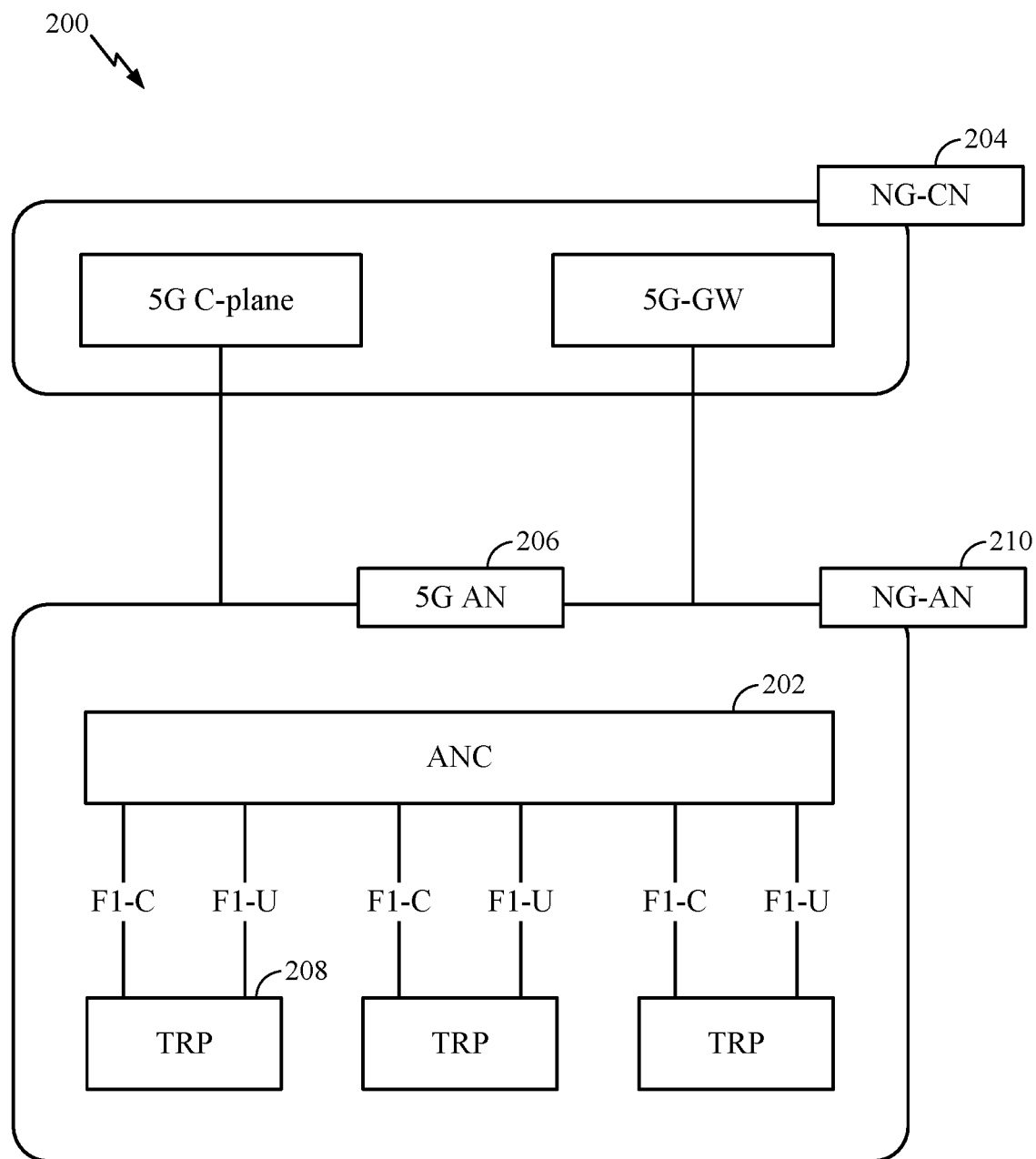
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
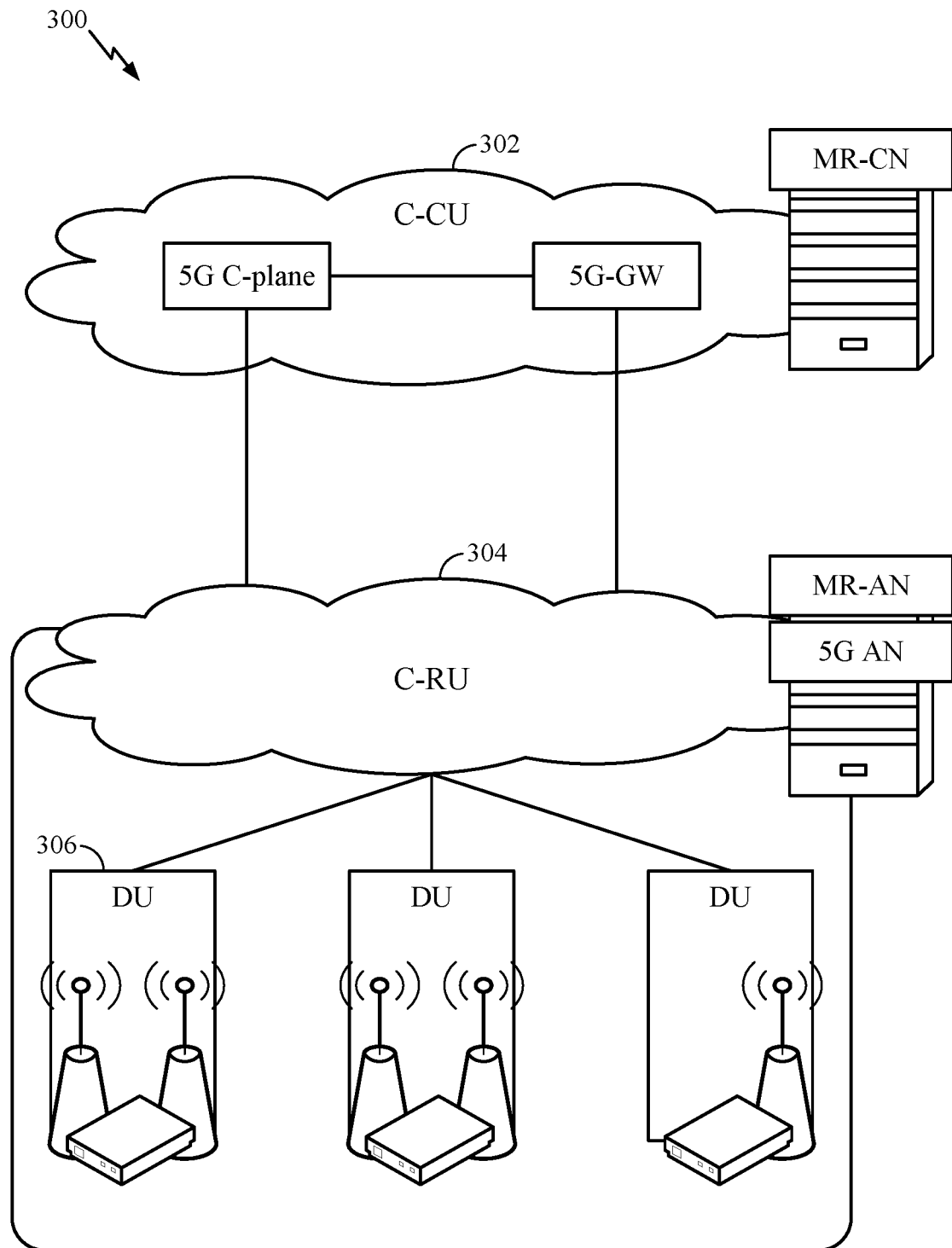
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
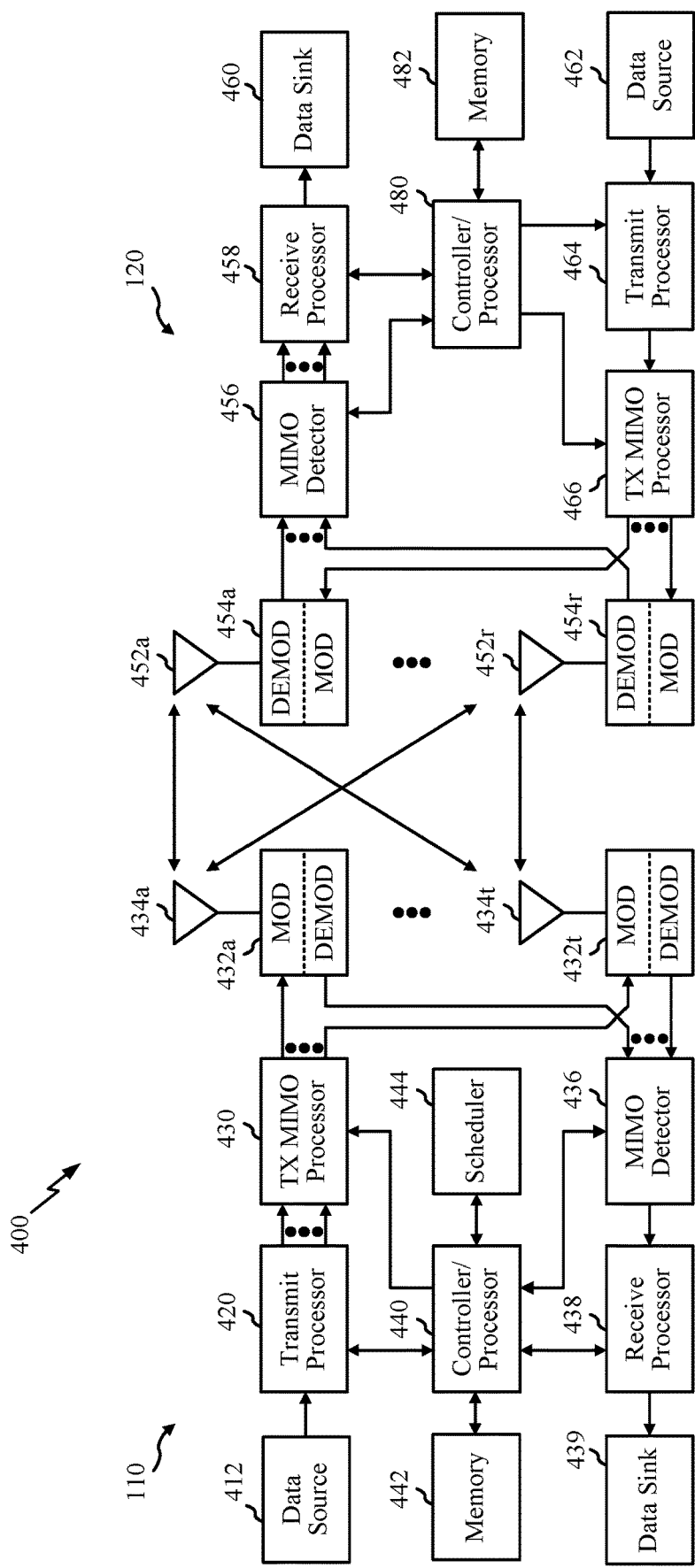
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
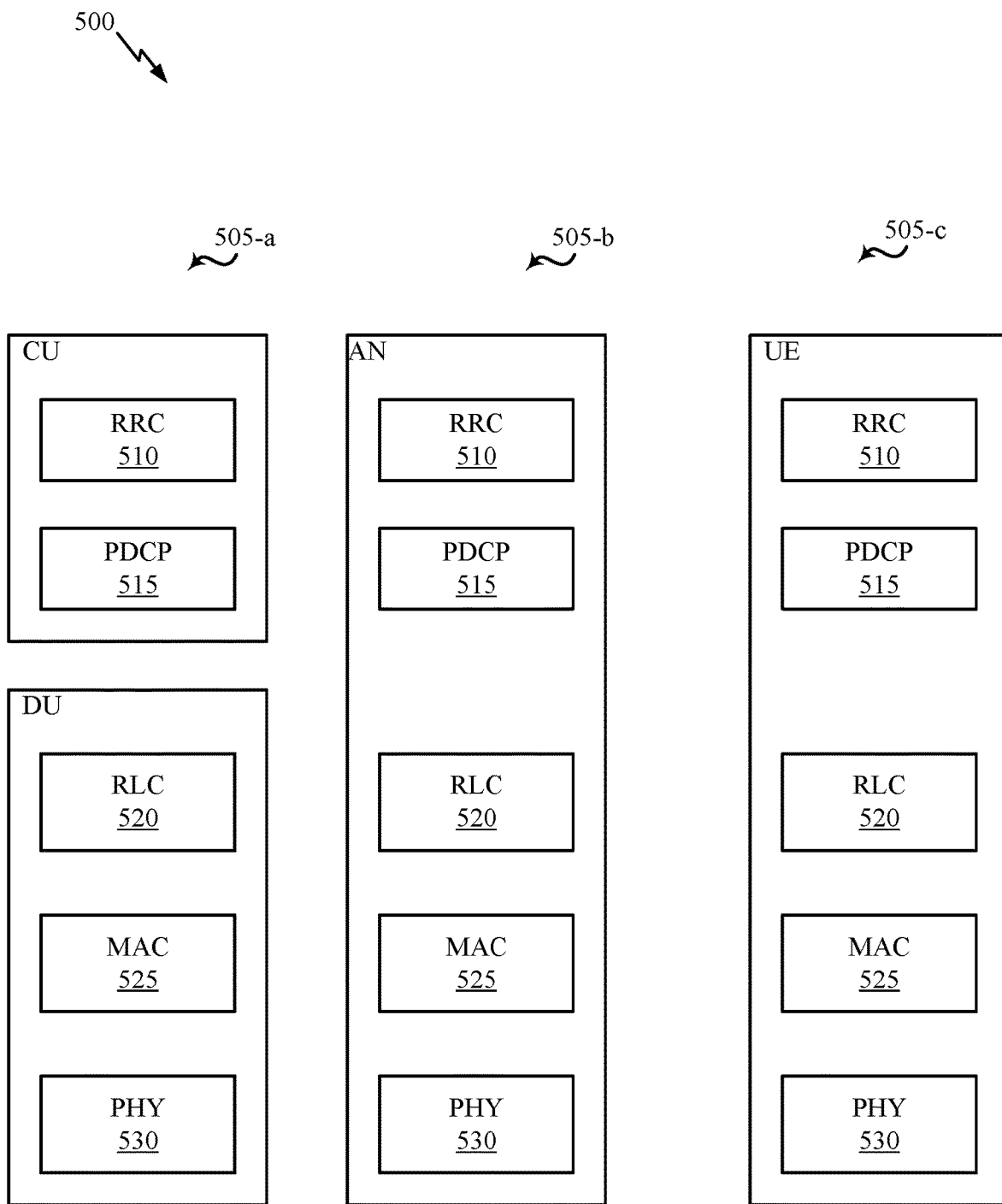
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
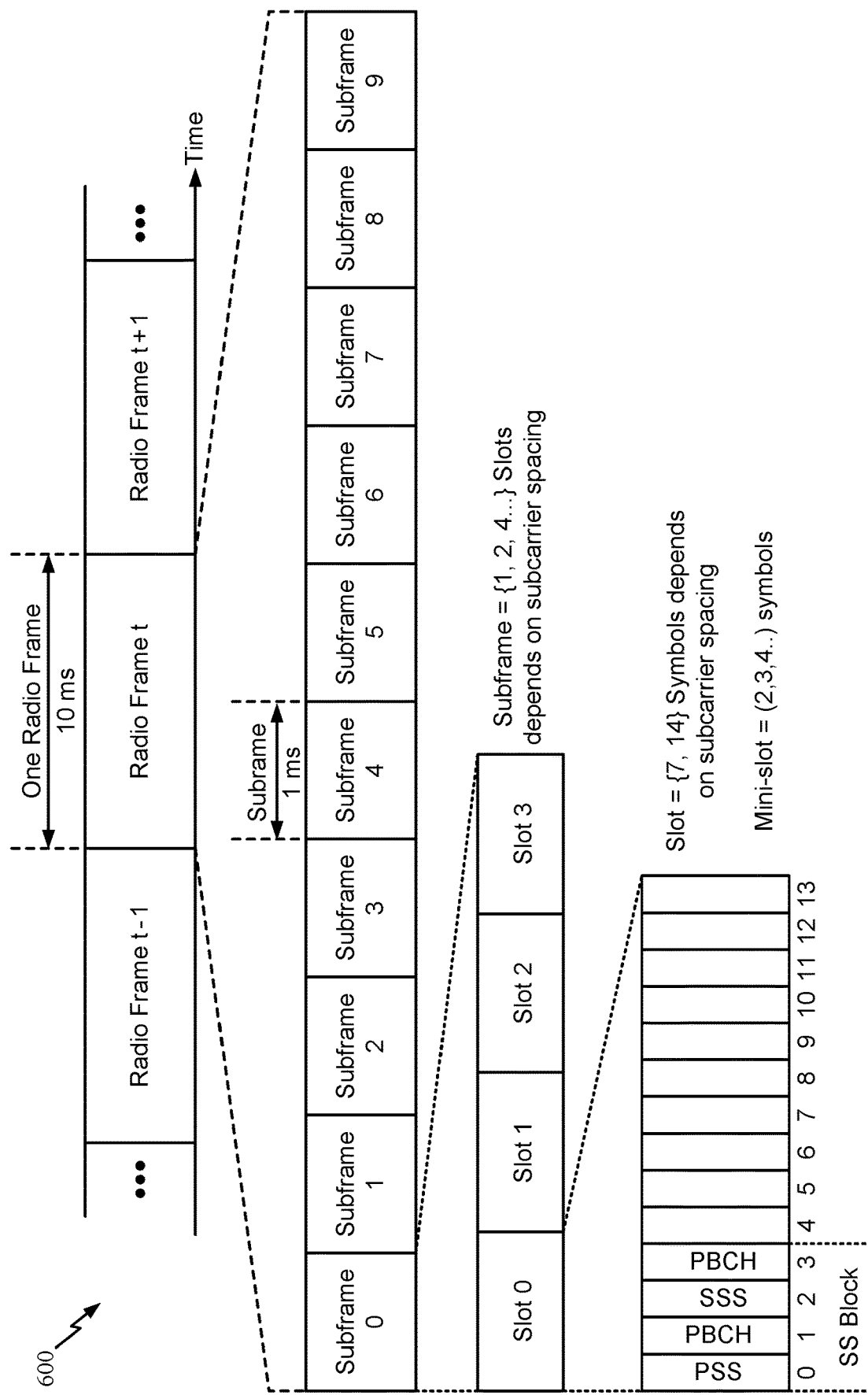
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block may be transmitted up to sixty-four times, for example, with up to sixty-four different beam directions for mmW. The up to sixty-four transmissions of the SS block are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example V2X Scenarios

Vehicle to everything (V2X) communications seek to enable vehicles to communicate with one another to provide a host of services, including vehicle to vehicle communications (V2V), vehicle to infrastructure (V2I) communications, vehicle to grid (V2G) communications and vehicle to people (V2P) communications.

Figure 7B:
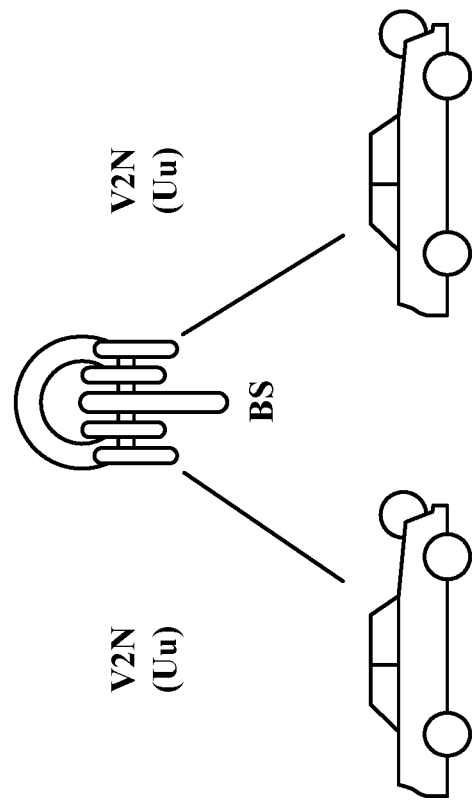
FIGS. 7A and 7B illustrate certain V2X communications scenarios, in which certain aspects of the present disclosure may be practiced.
Figure 7A:
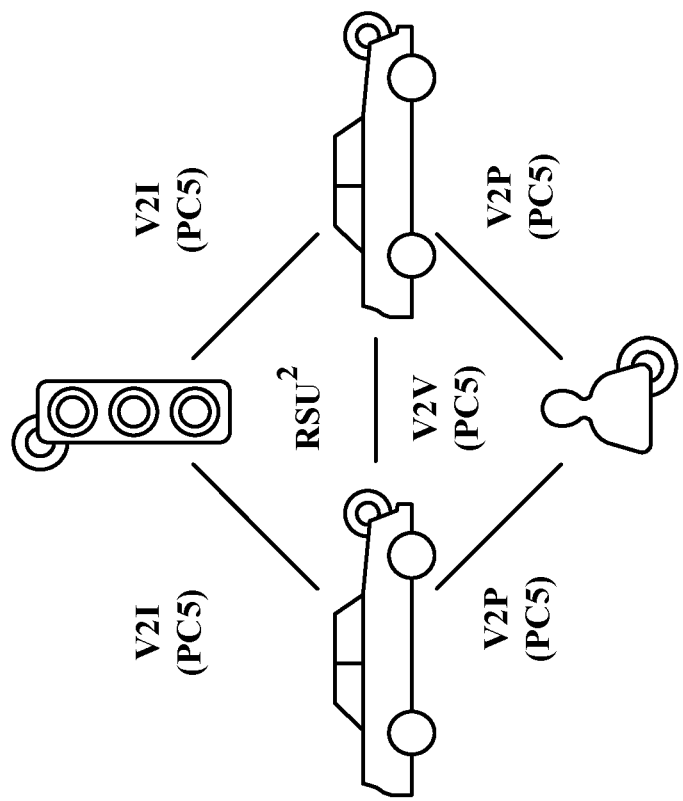

FIGS. 7A and 7B depict a V2X system in two complementary transmission modes. FIG. 7A shows a first transmission mode using direct communications between participants in the local area. FIG. 7B shows a second transmission mode using network communications through a network, such as an eNodeB.

As illustrated in FIG. 7A, the first transmission mode allows for direct communication between different participants in a given geographic location. For example, a vehicle can communicate with an individual (V2P) (e.g., through a PC5 interface). A vehicle can also communicate and another vehicle (V2V) (e.g., through a PC5 interface). Highway components, such as a traffic signal or other infrastructure may also be connected to vehicles in (V2I) communication. In each embodiment, each element may be a transmitter and a receiver and capable of two-way communication. In the configuration provided, the first transmission mode is a self-managed system and network assistance is not needed to facilitate the exchange of data. Such transmission modes provide for reduced cost and increased reliability as network service interruptions do not occur during handover operations for moving vehicles. Certain resource assignments for communication may also not need coordination between operators. Additionally, subscription to a network is not necessary.

In certain aspects, a V2X system is configured to work in a 5.9 GHz spectrum, thus any vehicle with an equipped system may access this common frequency and share information (e.g., codebooks (e.g., radar transmission parameter codebooks), sensor information (e.g., radar transmission parameters), etc.). V2X operations may also use other frequencies for communication (e.g., using 802.11p based communication). In one aspect, the V2X system may be operated in a 10 MHz band that describes/contains basic safety services. In other aspects, the V2X system may be operated over a wider frequency band.

In FIG. 7B, a second of two complementary transmission modes is illustrated. In certain aspects, a vehicle may communicate to another vehicle through network communications. These network communications may occur through discrete nodes, such as an eNodeB, that send and receive information between vehicles and a network. The network communications may be used, for example, for long range communications between vehicles, such as noting the presence of accident miles ahead. Other types of communications may be sent by the node to vehicles, such as traffic flow conditions, road hazard warnings, environmental/weather reports, service station availability, radar detection system information (e.g., codebooks, sensor information, etc.), to name a few. Data may also be obtained from cloud-based sharing services. Residential service units (RSUs) may be utilized as well as 4G/5G small cell communication technologies to benefit in more highly covered areas to allow real time information to be shared among V2X users. As the number of RSUs diminishes, the V2X systems may rely more on small cell communications or other technology.

Example Techniques for Signaling Frequency Hopping Signaling Via LBT Sequence or Resource In some scenarios, such as V2X scenarios illustrated in FIGS. 7A and 7B, direct communication between devices is "grant free." This means the devices essentially themselves reserve resources for data transmissions, rather than waiting for a scheduling entity (such as an eNB) to send a grant that allocates resources.

For such autonomous resource allocation, a device may transmit dedicated sequences to indicate, to other devices within range, the resource reservation for data transmission (s). The other devices, upon detecting a dedicated sequence may know the resources are in use and, in some cases, may avoid those resources (to avoid interference) or monitor those resources for data transmitted as part of a communications session. The dedicated sequence transmitted for this purpose may be referred to as a listen-before-talk (LBT) sequence, as a device typically sends the sequence only after observing (listening) to see if another device is attempting to reserve resources.

The transmission of an LBT sequence may indicate resource(s) for either one transmission or multiple transmissions. One transmission can be, for example, transmitted on one sub-channel, within certain bandwidth (in terms of resource blocks), and for a certain duration, such as one transmission time interval (TTI) or a certain number of OFDM symbols.

In some cases, when an LBT sequence is used to indicate multiple transmissions, it may be desirable to enable frequency hopping. With frequency hopping, different frequency resources may be used in different transmit opportunities (TTIs), for example, to achieve interference randomization or for diversity purpose, among multiple transmissions.

Aspects of the present disclosure provide techniques for a transmitting entity, such as a UE with data to transmit to another UE via V2X communications, to implicitly signal frequency hopping information for LBT-based transmissions. As will be described in greater detail below, in some cases, the LBT sequence itself indicates whether frequency hopping is enabled and/or how the frequency hopping should be performed. This approach may be considered resource-efficient, allowing the benefits of improved performance associated with frequency hopping when transmissions are based on autonomous resource allocation, but without introducing the added overhead of explicit signaling.

Figure 8:
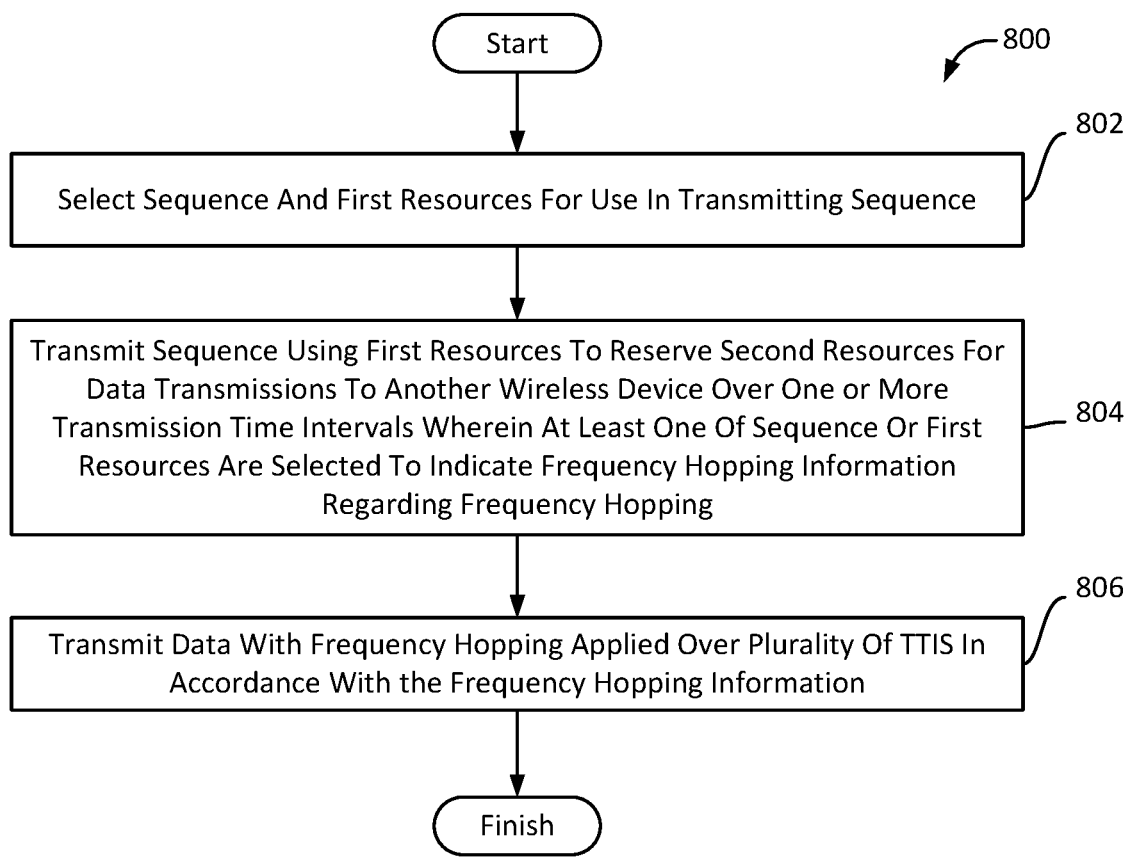
FIG. 8 illustrates example operations for wireless communications by a user equipment, in accordance with certain aspects of the present disclosure.

FIG. 8 illustrates example operations 800 for wireless communications by a user equipment. For example, operations 800 may be performed by a transmitting UE with data to send (directly) to another (receiving) UE as part of a V2X communications session.

According to aspects, the UE may include one or more components as illustrated in FIG. 4 which may be configured to perform the operations described herein. For example, the antenna 452, demodulator/modulator 454, controller/processor 480, and/or memory 482 as illustrated in FIG. 4 may perform the operations described herein.

Operations 800 begin, at 802, by selecting a sequence and first resources for use in transmitting the sequence. In some cases, the sequence may be selected from a set of sequences, for example, configured by a network and/or generated by the transmitting UE from a root sequence.

At 804, the UE transmits the sequence using the first resources to reserve second resources for data transmissions to another wireless device over one or more transmission time intervals (TTIs), wherein at least one of the sequence or the first resources are selected to indicate frequency hopping information regarding frequency hopping. At 806, the UE transmits the data with frequency hopping applied over the TTIs in accordance with the frequency hopping information.

Figure 9:
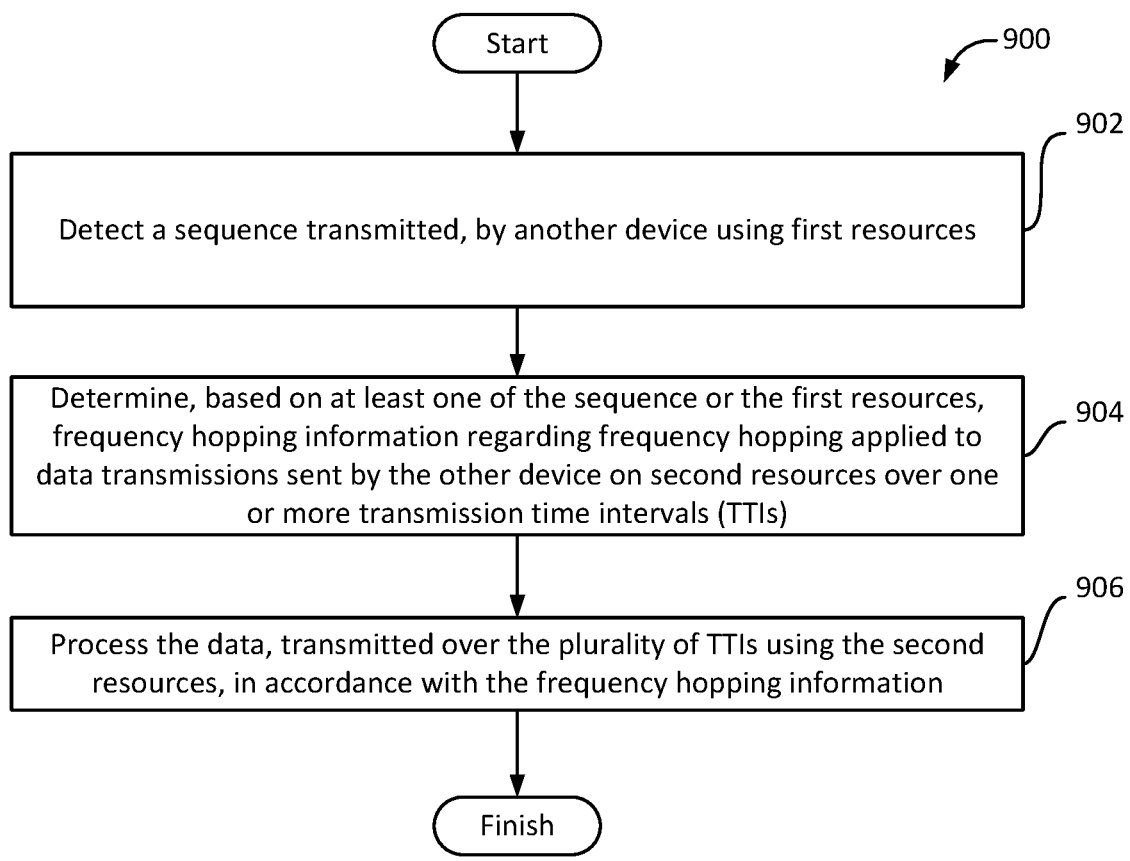
FIG. 9 illustrates example operations for wireless communications by a user equipment, in accordance with certain aspects of the present disclosure.

FIG. 9 illustrates example operations 900 for wireless communications by a UW, For example, operations 900 may be performed by a UE that is to receive data (directly) from another transmitting (UE) performing operations 800 described above, as part of V2X communications.

Again, the UE may include one or more components as illustrated in FIG. 4 which may be configured to perform the operations described herein. For example, the antenna 452, demodulator/modulator 454, controller/processor 480, and/ or memory 482 as illustrated in FIG. 4 may perform the operations described herein.

Operations 900 begin, at 902, by detecting a sequence transmitted by another device using first resources. At 904, the UE determines, based on at least one of the sequence or the first resources, frequency hopping information regarding frequency hopping used for data transmissions sent by the other device on second resources over one or more transmission time intervals (TTIs). At 906, the UE processes the data, transmitted over the TTIs using the second resources, in accordance with the frequency hopping information.

The signaling of frequency hopping information via a sequence may be achieved according to different options. According to a first option, multiple sets of LBT sequences (or multiple LBT sequences) may be specified and at least one of the sets (or at least one of the sequences) is used to indicate hopping. In other words, the transmitter may select a sequence from this set (one of these sets) if hopping is to be enabled. The receiver assumes hopping is enabled for the receive data channel when a sequence from this set (or sets) is detected/received.

The different sets of sequences may be defined in different ways. For example, different sequences or sets may be generated from different root sequences. For example, sequences with a certain root index (or different root indices) may be used when frequency hopping is to be enabled, for example, when a Zadoff-Chu sequence is used as an LBT sequence.

In some cases, the multiple sequences may have certain cyclic shift values. In such cases, for example, a root sequence with a certain value of its cyclic shift may be used to indicate that frequency hopping is enabled. In some cases, different cyclic shift values may be used to indicate different frequency hopping patterns.

In some cases, the sequences may be generated with different initializers of the sequence. One example is a Quadrature phase-shift keying (QPSK) modulated pseudo-random noise (PN) sequence may be used for generating an LBT sequence. In such cases, the LBT sequence that indicates hopping may have a different initializer parameter (or parameter value).

According to another option, the resources used to transmit the LBT sequence may indicate information about frequency hopping. For example, multiple time-frequency resources (or resource sets) may be used for LBT sequence transmission, with at least one resource (or one resource set) used to indicate frequency hopping. In such cases, the same sequence may have different meaning depending on the resource used for its transmission. In some cases, different resources may be selected for transmitting a sequence to indicate different frequency hopping patterns In this case, for example, the transmitter transmits the LBT sequence in a designated resource (or resource set) if hopping is to be enabled. In some cases, multiple resource pools may be allocated for LBT sequence and/or data transmission. At least one pool may be used for hopping. For example, frequency hopping may be enabled by default if an LBT sequence/data is transmitted using resources in this pool. In some cases, the definition/structure of the resource pool may be similar to LTE sidelink.

In some cases, with multiple resources allocated for LBT sequence transmission, at least one resource may be used for LBT sequence transmission when hopping is to be enabled. In other words, hopping is enabled by default if an LBT sequence is transmitted in this resource.

As used herein, the term resource may refer to a certain bandwidth (e.g., number of resource blocks) with some duration (e.g., a number of OFDM symbols). The multiple resources can be, for example, on different sub-bands/RBs of one component carrier, or different symbols in one TTI, or combination of the two.

In some cases, when hopping is enabled, the transmitter may perform frequency hopping by following a certain pattern or patterns. Just as whether frequency hopping is enabled may be signaled via the LBT sequence or resource, the pattern used may also be indicated via the selected LBT sequence (or the resources selected for transmitting the LBT sequence). Multiple patterns may be predefined/enabled and the LBT sequence (or resource used to transmit the LBT sequence) may also indicate the hopping pattern to be used. In other words, different LBT sequences (or resources/resource sets) may indicate different patterns used for data transmission.

The pattern at least differentiates the frequency resources used in different transmission occasions (TTIs). The pattern may also differentiate the redundancy versions (RVs) used in different transmission occasions. When hopping is enabled, the data transmitted in different occasions associated to the pattern may be just repetition(s) of a packet, may be the same packet with different RVs, or may be different packets.

In some cases, the hopping pattern may be defined by a set of parameters, such as bandwidth (BW), sub-channel BW, a number of transmission occasions in the pattern, or the like. The values for such parameters may be signaled/derived from system configurations/pre-configured.

Figure 10:
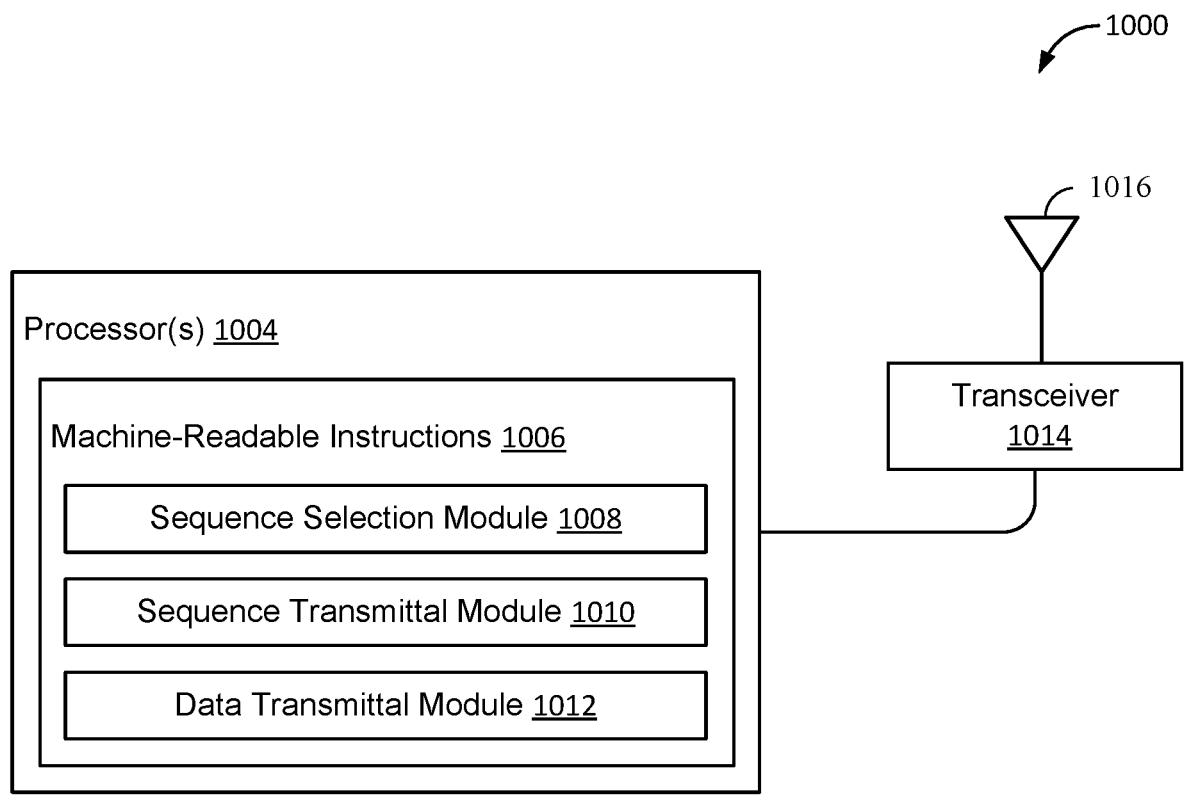
FIGS. 10 and 11 illustrate communications devices that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8.

The communications device 1000 includes a processing system 1004 (e.g., with one or more processors) coupled to a transceiver 1014. The transceiver 1014 is configured to transmit and receive signals for the communications device 1000 via an antenna 1016, such as the various signal described herein. The processing system 1004 may be configured to perform processing functions for the communications device 1000, including processing signals received and/or to be transmitted by the communications device 1000.

The processing system 1004 may include or be coupled to a computer-readable medium/memory 1006. In certain aspects, the computer-readable medium/memory 1006 is configured to store instructions that when executed by processors 1004, cause the processor 1004 to perform the operations illustrated in FIG. 8, or other operations for performing the various techniques discussed herein.

In certain aspects, the processing system 1004 and medium/memory 1006 may implement a sequence selection module/component 1008 for performing the operations illustrated in FIG. 8 at 802, a sequence transmittal module/component 1010 for performing the operations illustrated in FIG. 8 at 804, and a data transmittal module/component 1012 for performing the operations illustrated in FIG. 8 at 806.

Figure 11:
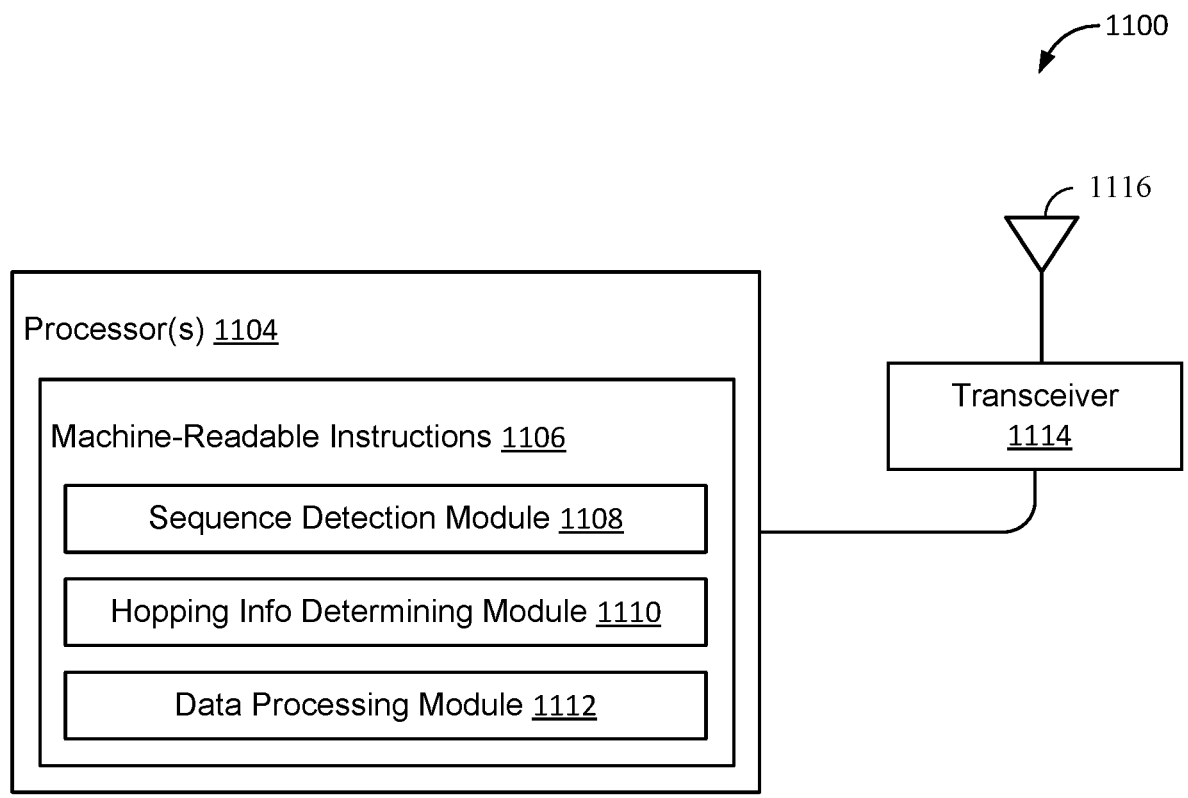

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1104 (e.g., with one or more processors) coupled to a transceiver 1114. The transceiver 1114 is configured to transmit and receive signals for the communications device 1100 via an antenna 1116, such as the various signal described herein. The processing system 1104 may be configured to perform processing functions for the communications device 1100, including processing signals received and/or to be transmitted by the communications device 1100.

The processing system 1104 may include or be coupled to a computer-readable medium/memory 1106. In certain aspects, the computer-readable medium/memory 1106 is configured to store instructions that when executed by processors 1104, cause the processor 1104 to perform the operations illustrated in FIG. 9, or other operations for performing the various techniques discussed herein.

In certain aspects, the processing system 1104 and medium/memory 1106 may implement a sequence detection module/component 1108 for performing the operations illustrated in FIG. 9 at 902, a frequency hopping information determining module/component 1110 for performing the operations illustrated in FIG. 9 at 904, and a data processing module/component 1112 for performing the operations illustrated in FIG. 9 at 906.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a wireless device, comprising:
selecting a listen-before-talk (LBT) sequence and first resources for use in transmitting the LBT sequence, wherein the LBT sequence comprises a dedicated sequence;
transmitting the LBT sequence using the first resources to reserve second resources for data transmissions to another wireless device over one or more transmission time intervals (TTIs), wherein at least one of the LBT sequence or the first resources are selected to indicate frequency hopping information regarding frequency hopping; and
transmitting the data with frequency hopping applied over the TTIs in accordance with the frequency hopping information.

2. The method of claim 1, wherein the data transmissions are for direct communications between the wireless device and another wireless device.

3. The method of claim 2, wherein the direct communications comprise vehicle-to-everything (V2X) communications.

4. The method of claim 1, wherein the TTIs comprise at least one of: a frame, a slot, or a set of symbols.

5. The method of claim 1, wherein the frequency hopping information indicates at least one of whether frequency hopping is enabled for the data transmissions or how the frequency hopping is performed.

6. The method of claim 1, wherein:
the LBT sequence is selected, from at least one set of LBT sequences used to indicate the frequency hopping information.

7. The method of claim 6, wherein:
the LBT sequences in the set of LBT sequences are generated using at least one of: different root sequences, different cyclic shift values applied to a common root sequence, or different initializer values to indicate the frequency hopping information.

8. The method of claim 1, wherein the first resources are selected from at least one pool of resources used to indicate frequency hopping is used for the data transmissions.

9. The method of claim 8, wherein the pool of resources span at least one of different sub-bands of a component carrier or different symbols within one TTI.

10. The method of claim 1, wherein:
the data is transmitted according at least one frequency hopping pattern that differentiates frequency resources used in different TTIs; and
the frequency hopping information indicates the pattern.

11. The method of claim 10, wherein the pattern also differentiates a redundancy version (RV) used in different TTIs.

12. The method of claim 10, wherein data transmitted according to the pattern comprises:
repetition of a same packet in each TTI;
a same packet with a different redundancy version (RV) in each TTI; or different packets in different TTIs.

13. A method for wireless communications by a wireless device, comprising:
detecting a listen-before-talk (LBT) sequence transmitted, by another device using first resources, wherein the LBT sequence comprises a dedicated sequence;
determining, based on at least one of the LBT sequence or the first resources, frequency hopping information regarding frequency hopping to be applied for data transmissions on second resources from the other device over one or more transmission time intervals (TTIs); and
processing the data, transmitted over the TTIs using the second resources, in accordance with the frequency hopping information.

14. The method of claim 13, wherein the data transmissions are for direct communications between the wireless device and another wireless device.

15. The method of claim 14, wherein the direct communications comprise vehicle-to-everything (V2X) communications.

16. The method of claim 13, wherein the TTIs comprise at least one of: a frame, a slot, or a set of symbols.

17. The method of claim 13, wherein the frequency hopping information indicates at least one of whether frequency hopping is enabled for the data transmissions or how the frequency hopping is performed.

18. The method of claim 13, wherein:
the wireless device determines the frequency hopping information if the LBT sequence is selected from a set of LBT sequences used to indicate the frequency hopping information.

19. The method of claim 18, wherein:
the LBT sequences in the set of LBT sequences are generated using at least one of: different root sequences, different cyclic shift values applied to a common root sequence, or different initializer values to indicate the frequency hopping information.

20. The method of claim 13, wherein the wireless device determines the frequency hopping information if the first resources are selected from a pool of resources used to indicate frequency hopping is used for the data transmissions.

21. The method of claim 20, wherein the pool of resources span at least one of different sub-bands of a component carrier or different symbols within one TTI.

22. The method of claim 13, wherein:
the frequency hopping information indicates a pattern that differentiates frequency resources used in different TTIs; and
the data is also processed according to the pattern.

23. The method of claim 22, wherein the pattern also differentiates a redundancy version (RV) used in different TTIs.

24. The method of claim 22, wherein data transmitted according to the pattern comprises:
repetition of a same packet in each TTI;
a same packet with a different redundancy version (RV) in each TTI; or
different packets in different TTIs.

25. An apparatus for wireless communications, comprising:
at least one processor configured to select a listen-before-talk (LBT) sequence and first resources for use in transmitting the LBT sequence, wherein the LBT sequence comprises a dedicated sequence; and a transmitter configure to transmit the LBT sequence using the first resources to reserve second resources for data transmissions to another wireless device over one or more transmission time intervals (TTIs), wherein at least one of the LBT sequence or the first resources are selected to indicate frequency hopping information regarding frequency hopping and transmit the data with frequency hopping applied over the TTIs in accordance with the frequency hopping information.

26. An apparatus for wireless communications, comprising:
   a receiver configured to detect a listen-before-talk (LBT) sequence transmitted, by another device using first resources, wherein the LBT sequence comprises a dedicated sequence; and
   at least one processor configured to determine, based on at least one of the LBT sequence or the first resources, frequency hopping information regarding frequency hopping to be applied for data transmissions from the other device over one or more transmission time intervals (TTIs) and process the data, transmitted over the TTIs using the second resources, in accordance with the frequency hopping information.

* * * * *